United States Patent
Mir et al.

(10) Patent No.: US 8,453,154 B2
(45) Date of Patent: May 28, 2013

(54) SYSTEM AND METHOD FOR MANAGING MEMORY RESOURCE(S) OF A WIRELESS HANDHELD COMPUTING DEVICE

(75) Inventors: Idris Mir, San Diego, CA (US); Rajiv K. Vijayakumar, San Diego, CA (US); Samson Jim, San Diego, CA (US); Mark Bapst, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 12/897,327

(22) Filed: Oct. 4, 2010

(65) Prior Publication Data

US 2012/0084784 A1 Apr. 5, 2012

(51) Int. Cl.
*G06F 9/46* (2006.01)
*G06F 13/00* (2006.01)
*G06F 12/00* (2006.01)

(52) U.S. Cl.
USPC ............ 718/104; 711/156; 711/159; 707/819

(58) Field of Classification Search
None
See application file for complete search history.

(56) References Cited

U.S. PATENT DOCUMENTS

| | | | |
|---|---|---|---|
| 6,266,742 B1 * | 7/2001 | Challenger et al. | 711/133 |
| 6,272,598 B1 | 8/2001 | Arlitt et al. | |
| 6,282,616 B1 * | 8/2001 | Yoshida et al. | 711/133 |
| 6,651,143 B2 * | 11/2003 | Mounes-Toussi | 711/138 |
| 6,915,307 B1 * | 7/2005 | Mattis et al. | 1/1 |
| 6,950,864 B1 * | 9/2005 | Tsuchiya | 709/223 |
| 7,076,611 B2 * | 7/2006 | Steere et al. | 711/133 |
| 8,204,953 B2 * | 6/2012 | Luna et al. | 709/213 |
| 2005/0027943 A1 * | 2/2005 | Steere et al. | 711/133 |
| 2012/0110109 A1 * | 5/2012 | Luna et al. | 709/213 |
| 2012/0260264 A1 * | 10/2012 | Inagaki et al. | 719/316 |

OTHER PUBLICATIONS

International Search Report and Written Opinion—PCT/US2011/049839—ISA/EPO—Dec. 6, 2011.

* cited by examiner

*Primary Examiner* — Jennifer To
(74) *Attorney, Agent, or Firm* — Nicholas A. Cole

(57) ABSTRACT

A method and system for managing one or more memory resources of a wireless handheld computing device is described. The method and system may include receiving a request to initiate a web browser module and receiving input for a web address. The method and system may also include receiving a file corresponding to the web address and reviewing one or more objects present within the file. The method and system may determine if an object already exists in the one or more memory resources. And if the object does not exist in the one or more memory resources, then the method and system may calculate a priority for the object. The priority of the object may then be assigned and stored. It may also be determined if the current object will exceed the threshold of the one or more memory resources, and discarding other objects with lower priority as needed.

24 Claims, 13 Drawing Sheets

SYSTEM AND METHOD FOR MANAGING MEMORY RESOURCE(S) OF A WIRELESS HANDHELD COMPUTING DEVICE

DESCRIPTION OF THE RELATED ART

Today's computing environment is becoming more and more portable. People often surf the Internet with their wireless handheld computing devices with such ease similar to how people starting using mobile telephones for placing ordinary telephone calls. Typical conventional wireless handheld computing devices, include but are not limited to, devices like mobile phones, personal digital assistants ("PDAs"), as well as "Smart" phones. These wireless handheld computing devices usually fit within a person's hand or can be carried around with one hand by a person.

While these wireless handheld computing devices, have made the computing environment more accessible while people are on the "go", wireless handheld computing devices have created some unique problems with respect to performance of these devices within wireless networks. Some problems relating to performance include slow download of data when wireless network bandwidth is low, and slow communications due to reception errors. This performance is often a function of the hardware and software which can be contained within the tight, electronic packaging of these handheld sized units. The performance of these handheld sized units may also be a function of the wireless network in which the wireless handheld computing device establishes a communication link.

Typical communication links that are desired by users of wireless handheld computing devices are those which usually involve surfing the Internet or web with a web-based browser application program that may be executed by a central processing unit of the handheld computing device. Typically, the content of webpages may take some time to load onto the wireless handheld computing device because of factors which relate to the mobile network. One factor that can negatively impact the performance of a wireless handheld computing device is when the handheld computing device establishes a communication link with a wireless communications network that may be experiencing a lower bandwidth.

Another factor relating to wireless communication networks is latency. Latency in packet-switched networks is measured either one-way (the time from the source sending a packet to the destination receiving it), or round-trip (the one-way latency from source to destination plus the one-way latency from the destination back to the source). Higher latency in wireless communication networks generally causes web pages on a wireless handheld computing device to take a longer time to load compared to those networks with low or minimal latencies. Generally, most wireless handheld computing devices do not compensate for the factors which negatively impact the performance of a wireless communications network.

What is needed is a system and method that can offset or compensate for factors which negatively impact the performance wireless handheld computing devices when they are coupled to a wireless communications network.

SUMMARY OF THE DISCLOSURE

According to a first exemplary aspect, a method for managing one or more memory resources of a wireless handheld computing device is described. The method may include receiving a request to initiate a web browser module and receiving input for a web address. The method includes receiving a file corresponding to the web address and reviewing addresses of objects present within the file. The method may determine if an object at an address already exists in the one or more memory resources. And if the object does not exist in the one or more memory resources, then the method may calculate a priority for the object. The priority of the object may then be assigned and stored.

According to another aspect, a computer system for managing one or more memory resources of a wireless handheld computing device is described. The computer system includes a processor operable to receive a request to initiate a web browser module and operable to receive input for a web address. The processor is operable to receive a file corresponding to the web address and review one or more object addresses present within the file. The processor may then determine if an object already exists in the one or more memory resources and if the object does not exist in the one or more memory resources, then the processor may calculate a priority for the object. Next, the processor may assign the priority to the object.

In another exemplary aspect, a computer system for managing one or more memory resources of a wireless handheld computing device is described. The system includes means for receiving a request to initiate a web browser module and means for receiving input for a web address. The system further includes means for receiving a file corresponding to the web address and means for reviewing one or more object addresses present within the file. The system may also have means for determining if an object already exists in the one or more memory resources. The system may have means for calculating a priority for the object if the object does not exist in the one or more memory resources and means for assigning the priority to the object.

According to a further exemplary aspect, a computer program product comprising a computer usable medium having a computer readable program code embodied therein, the computer readable program code adapted to be executed to implement a method for managing one or more memory resources of a wireless handheld computing device is described. The computer program product having the program code implementing the method includes receiving a request to initiate a web browser module and receiving input for a web address. The computer program product having the program code implementing the method also includes receiving a file corresponding to the web address and reviewing one or more object addresses present within the file. The computer program product with the program code implementing the method may further include determining if an object already exists in the one or more memory resources and determining if the object does not exist in the one or more memory resources, then calculating a priority for the object. The computer program product having the program code implementing the method may have a step for assigning the priority to the object.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communication device," and "wireless handset" are used interchangeably. With the advent of third generation ("3G") wireless technology, greater bandwidth availability has enabled more electronic devices with a greater variety of wireless capabilities. Therefore, a wireless device could be a cellular telephone, a pager, a PDA, a smartphone, a navigation device, or a hand-held computer with a wireless connection or link.

Figure 1A:
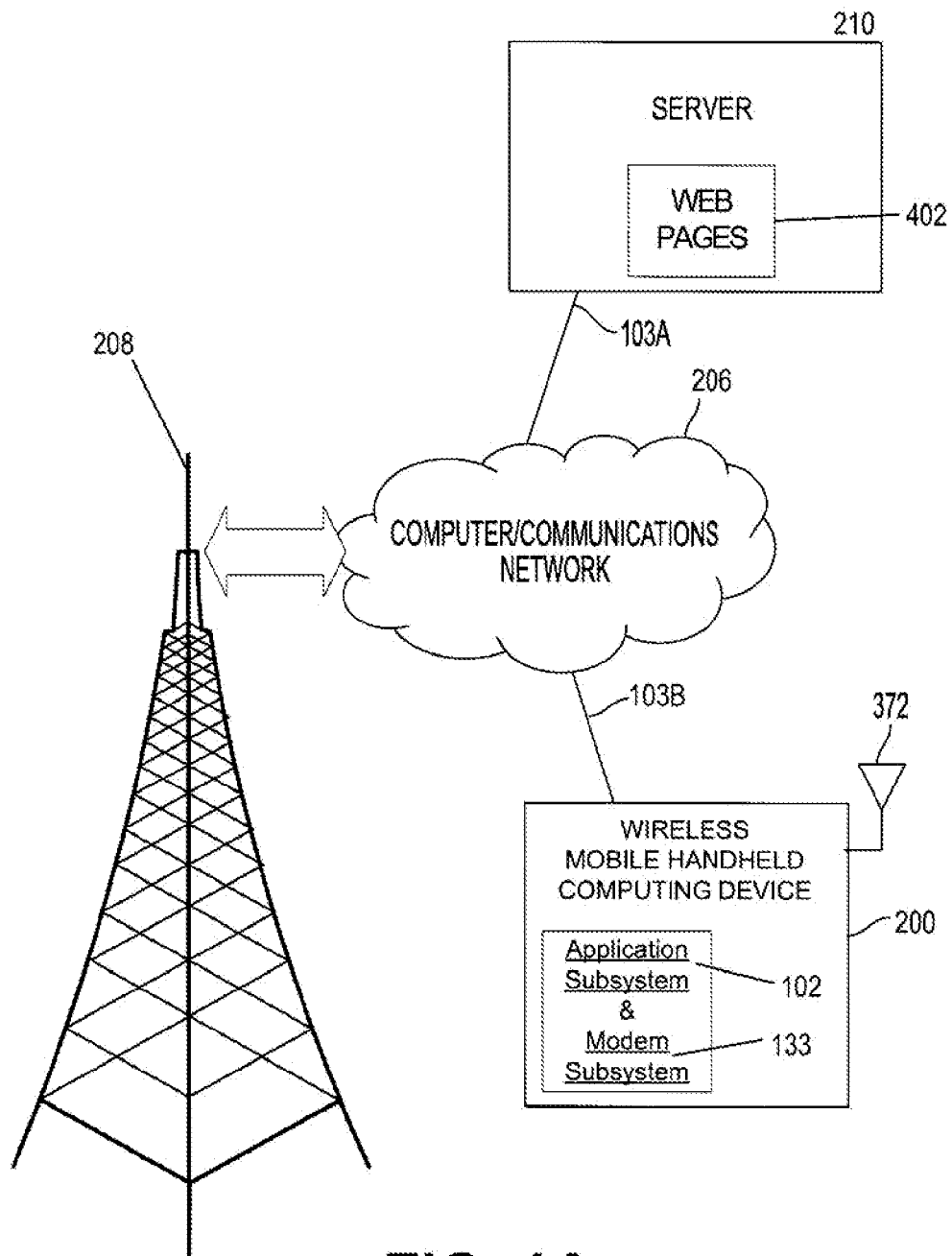
FIG. 1A is a diagram of a wireless handheld computing device coupled to a wireless communications network.

FIG. 1A is a diagram of a wireless handheld computing device 200 coupled to a wireless communications network 206. Many of the system elements illustrated in FIG. 1 are coupled via communications links 103A-B to the communications network 206. The links 103 illustrated in FIG. 1 may comprise wireless links. Wireless links include, but are not limited to, radio-frequency ("RF") links, infrared links, acoustic links, and other wireless mediums. The communications network 206 may comprise a wide area network ("WAN"), a local area network ("LAN"), the Internet, a Public Switched Telephony Network ("PSTN"), a paging network, or a combination thereof. The communications network 206 may be established by broadcast RF transceiver towers 208. However, one of ordinary skill in the art recognizes that other types of communication devices besides broadcast RF transceiver towers 208 are included within the scope of the invention for establishing the communications network 206.

The server 210 may support a web pages 402 that may be downloaded and stored in memory by the wireless handheld computing device 200. The handheld computing device 200 is shown to have an antenna 372 so that a respective handheld device 200 may establish wireless communication links 103 with the communications network 206.

The server 210 may communicate with the wireless handheld computing device 200 across the communications network 206 in order to share its webpages 402 with the handheld computing device 200 that are processed and managed by the application subsystem 102 and modem subsystem 133 of the handheld computing device 200.

Figure 1B:
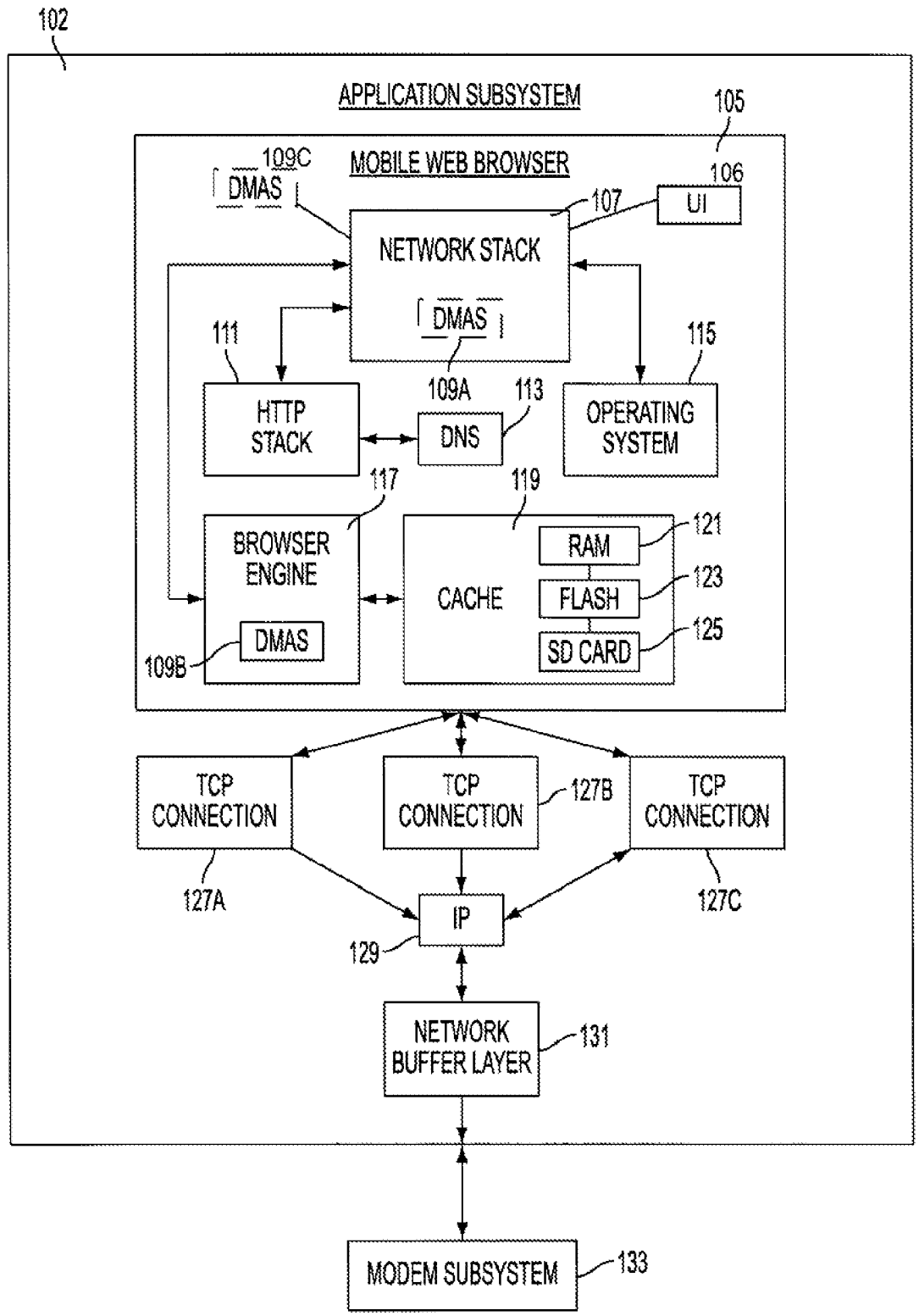
FIG. 1B is a diagram of a first aspect of a software architecture for a system that manages memory resource(s) of the wireless, handheld computing device of FIG. 2.

FIG. 1B is a diagram of a first aspect of a software architecture for a system 102 that manages memory resource(s) of a wireless, handheld computing device 200. The application subsystem 102 may comprise a mobile web browser application 105 that is executed by a central processing unit 324 (see FIG. 2). The mobile web browser application or module 105 may communicate with transfer communication protocol ("TCP") modules 127 that reside over an Internet protocol ("IP") layer 129 as understood to one of ordinary skill in the art and described below.

The IP layer 129 communicates with a network buffer layer 131 as understood by one of ordinary skill the art. The IP layer 129 communicates with the modem subsystem 133, which is executed by a second central processing unit 326 (see FIG. 2).

The mobile web browser module 105 may further comprise a user interface module 106, a network stack module 107, a hypertext transfer protocol ("HTTP") stack 111, a domain name server module 113, an operating system 115, a browser engine 117, and one or more memory resources 119 that may include, but are not limited to, a cache, random access memory ("RAM"), flash memory 123, a Secure Digital ("SD") memory card 125, and any combination thereof.

The network stack module 107 may further comprise a dynamic memory allocation system ("DMAS") module 109A which includes the logic illustrated in FIGS. 12-14 as described in further detail below. Alternatively, or in addition to the network stack 107, the browser engine 117 may also comprise a DMAS module 109B which also includes the logic of FIGS. 12-1.4 described below. In a further alternative exemplary embodiment, the DMAS module 109C may reside as a separate module relative to the network stack 107 and browser engine 117.

The DMAS module(s) 109 may be responsible for controlling or instructing how the browser engine 117 should manage the memory resources 119 that may comprise a cache, RAM 121, flash memory 123, and/or an SD memory card 125. The DMAS module 109 may be dynamic in that it may continually monitor elements of the mobile web browser 105 as well as the application subsystem 102. Further, the DMAS module 109 may also receive messages from elements within the mobile web browser 105 and the application subsystem 102.

The network stack module 107 may communicate with the user interface 106, the HTTP stack module 111, the operating system ("OS") 15, and the browser engine 117. The network stack module 107 may receive commands from the user interface 106 such as a command to access a new webpage 402 stored on the server 210. The network stack 107 may also monitor messages received from the operating system 115 which may address current status, and identifying what other application programs besides the mobile web browser 105 that have been opened and are being executed by the central processing unit 324.

The network stack module 107 may issue commands, such as providing the text based domain name provided by a user for a desired webpage 402, to the HTTP stack module 111. The HTTP stack module 111 may be coupled to the domain name server ("DNS") module 113. The DNS module 113 may be responsible for translating the text based domain name into the numeric Internet protocol (IP) address as understood by one of ordinary skill the art. The DNS module 113 may communicate the IP address back to the HTTP stack 111 which in turn relays it to the TCP connection module 127.

When the HTTP stack 111 returns an HTML file 600 (See FIG. 6) from the TCP connection module 127, the network stack module 107 relays this file 600 to the browser engine 117. The browser engine 117 is responsible for parsing and/or reviewing the retrieved files and transmitting requests based on its review of the files to the network stack 107. The browser engine 117 may also issue commands to control the allocation of the memory resources 119 that may include a cache, RAM 121, flash memory 123, and an SD memory card 125.

The OS 115 may be responsible for the management and coordination of processes and the sharing of hardware resources within the handheld computing device. The OS 115 may act as a host for computing applications running on the OS 115. One of the purposes of the operating system 115 is to handle the resource allocation and access protection of the hardware, such as the display 332 and microphone 360. Exemplary handheld OS 115 as of this writing may include, but are not limited to, WINDOWS™ mobile brand of mobile operating systems 115 as well as ANDROID™ brand of mobile operating systems 115.

The Transport Control Protocol ("TCP") connection module 127 operates in the Transport Layer of the Open Systems Interconnection ("OSI") model of general networking as understood by one of ordinary skill in the art. The TCP connection module 127 is responsible for encapsulating application data blocks into data units (datagrams, segments) suitable for transfer to the network infrastructure for transmission to the destination host, or managing the reverse transaction by abstracting network datagrams and delivering their payload to the mobile web browser 105.

The Internet Protocol ("IP") module 129 communicates with the TCP connection module 127 and the network buffer layer 131. The IP module 129 has the task of delivering distinguished protocol datagrams (packets) from the mobile web browser to the server 210 based on their addresses. The IP module 129 defines addressing methods and structures for datagram encapsulation. The IP module 129 may utilize Internet Protocol Version 4 ("IPv4") as well as Internet Protocol Version 6 ("IPv6"), which is being deployed actively as of this writing. However, other versions of the Internet protocol, including future ones not yet developed, are included within the scope of the invention.

The network buffer layer 131 communicates with the IP module 129 and the modem subsystem 133. The network buffer layer 131 may contain all hardware specific interface methods, such as Ethernet and other IEEE 802 encapsulation schemes. The network buffer layer 131 may probe the topology of a local network, such as the communications network such as network 206. It may discover routers and neighboring hosts, and it may be responsible for discovery of other nodes on the link. The network buffer layer 131 may determine the link layer addresses of other nodes, find available routers, and maintaining reachability information about the paths to other active neighbor nodes.

The modem subsystem 133 may comprise a radio link control layer, a media access control (MAC) layers, as well as a physical layer. These layers may be responsible for communicating with communications hardware such as the RF transceiver 368 as illustrated in FIG. 2.

Figure 2:
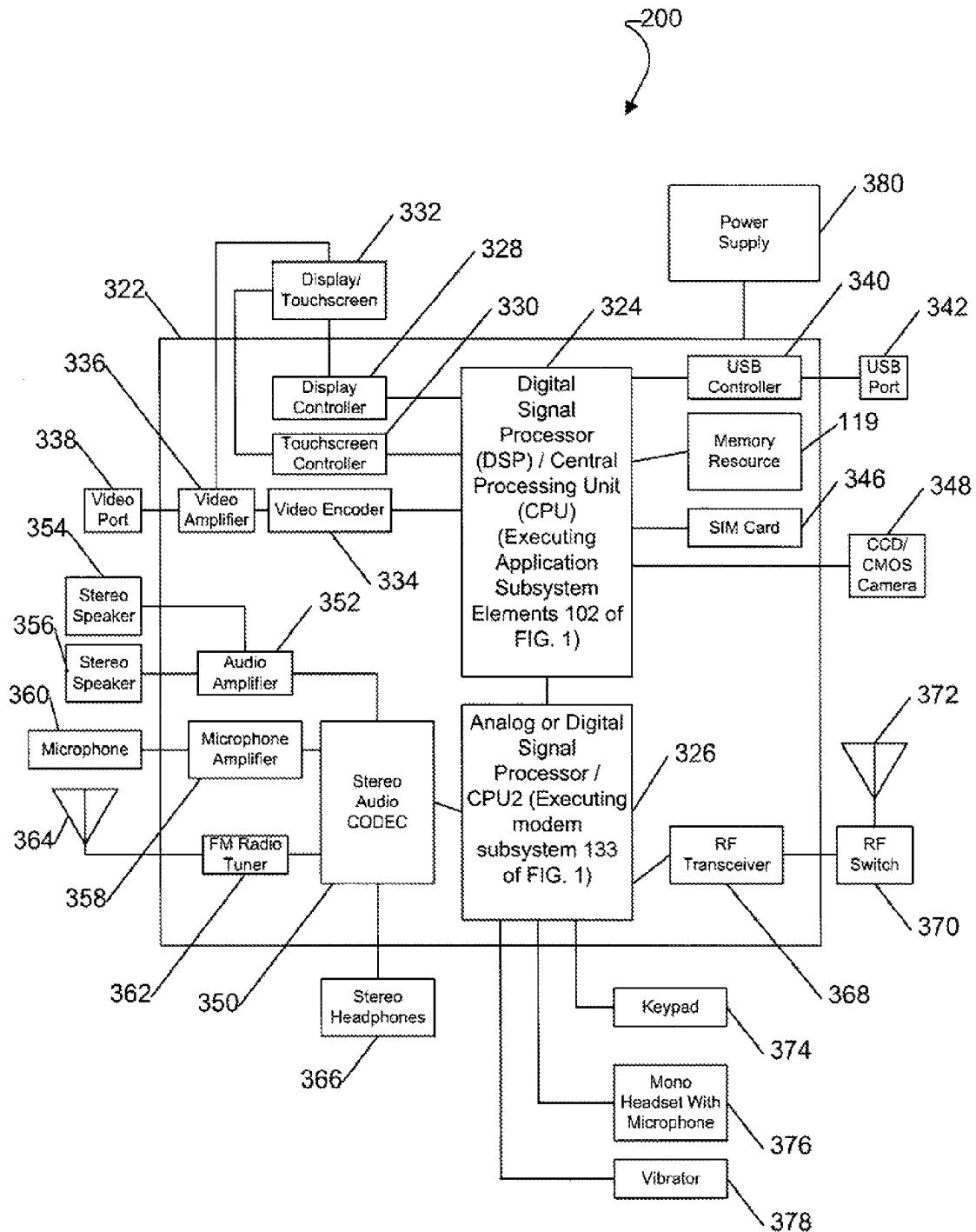
FIG. 2 is a diagram of an exemplary wireless handheld computing device that comprises a mobile telephone.

Referring to FIG. 2, this figure is a diagram of an exemplary, non-limiting aspect of a wireless handheld computing device 200 comprising a wireless telephone which corresponds with the wireless handheld computing device of FIG. 1. As shown, the wireless handheld computing device 102 includes an on-chip system 322 that includes a digital signal processor and/or a first central processing unit 324 AND an analog signal processor and/or second central processing unit 326 that are coupled together. Further, the first processor 324 and the memory resources 119 may serve as a means for executing one or more of the method steps described in this disclosure in connection with FIGS. 12-14. Meanwhile, the second digital signal processor/central processing unit 326 may execute one or more instructions relating to the modem subsystem 133.

As illustrated in FIG. 2, a display controller 328 and a touchscreen controller 330 are coupled to the digital signal processor 324. A touchscreen display 332 external to the on-chip system 322 is coupled to the display controller 328 and the touchscreen controller 330.

FIG. 2 further indicates that a video encoder 334, e.g., a phase-alternating line ("PAL") encoder, a sequential couleur avec memoire ("SECAM") encoder, a national television system(s) committee ("NTSC") encoder or any other video encoder, is coupled to the digital signal processor 324. As noted previously, the first digital signal processor 324 and/or second digital signal processor 326 may be substituted with a Central Processor Unit as understood to one of ordinary skill in the art. Either hardware unit may execute the subsystem of software elements/instructions of FIGS. 12-14.

A video amplifier 336 is coupled to the video encoder 334 and the touchscreen display 332. A video port 338 is coupled to the video amplifier 336. As depicted in FIG. 2, a universal serial bus ("USB") controller 340 is coupled to the digital signal processor 324. Also, a USB port 342 is coupled to the USB controller 340. The memory resources 119 and a subscriber identity module ("SIM") card 346 may also be coupled to the digital signal processor 324. Further, as shown in FIG. 2, a digital camera 348 may be coupled to the digital signal processor 324. In an exemplary aspect, the digital camera 348 is a charge-coupled device ("CCD") camera or a complementary metal-oxide semiconductor ("CMOS") camera.

As further illustrated in FIG. 2, a stereo audio CODEC 350 may be coupled to the analog signal processor 326. Moreover, an audio amplifier 352 may be coupled to the stereo audio CODEC 350. In an exemplary aspect, a first stereo speaker 354 and a second stereo speaker 356 are coupled to the audio amplifier 352. FIG. 2 shows that a microphone amplifier 358 may be also coupled to the stereo audio CODEC 350. Additionally, a microphone 360 may be coupled to the microphone amplifier 358. In a particular aspect, a frequency modulation ("FM") radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 2 further indicates that a radio frequency ("RF") transceiver 368 may be coupled to the analog signal processor 326. An RF switch 370 may be coupled to the RF transceiver 368 and an RF antenna 372. The RF transceiver 368 may communicate with conventional communications networks as well as with global positioning system ("GPS") satellites in order to obtain GPS signals for geographical coordinates.

As shown in FIG. 2, a keypad 374 may be coupled to the analog signal processor 326. Also, a mono headset with a microphone 376 may be coupled to the analog signal processor 326. Further, a vibrator device 378 may be coupled to the analog signal processor 326. FIG. 2 also shows that a power supply 380 may be coupled to the on-chip system 322. In a particular aspect, the power supply 380 is a direct current ("DC") power supply that provides power to the various components of the wireless handheld computing device 102 that require power. Further, in a particular aspect, the power supply is a rechargeable DC battery or a DC power supply that is derived from an alternating current ("AC") to DC transformer that is connected to an AC power source.

As depicted in FIG. 2, the touchscreen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

Figure 3:
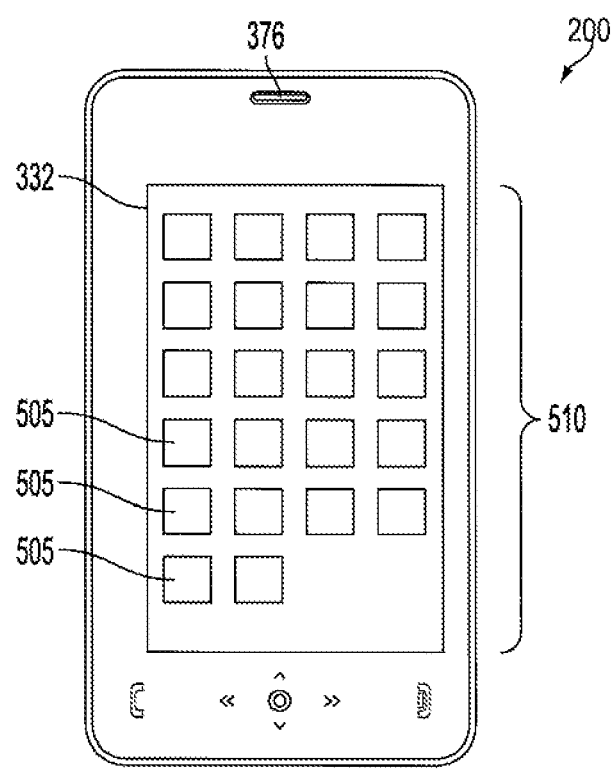
FIG. 3 is a diagram of a touch screen for a wireless handheld computing device.

FIG. 3 is a diagram of a touch screen display 332 for a wireless handheld computing device 200. As shown, the wireless handheld computing device 200 may include a menu or listing 510 of program icons 505, represented as square boxes in this exemplary embodiment. The wireless handheld computing device 200 also includes a headset or speaker 376 that may be positioned next to a user's ear for listening to a mobile phone conversation.

Figure 4:
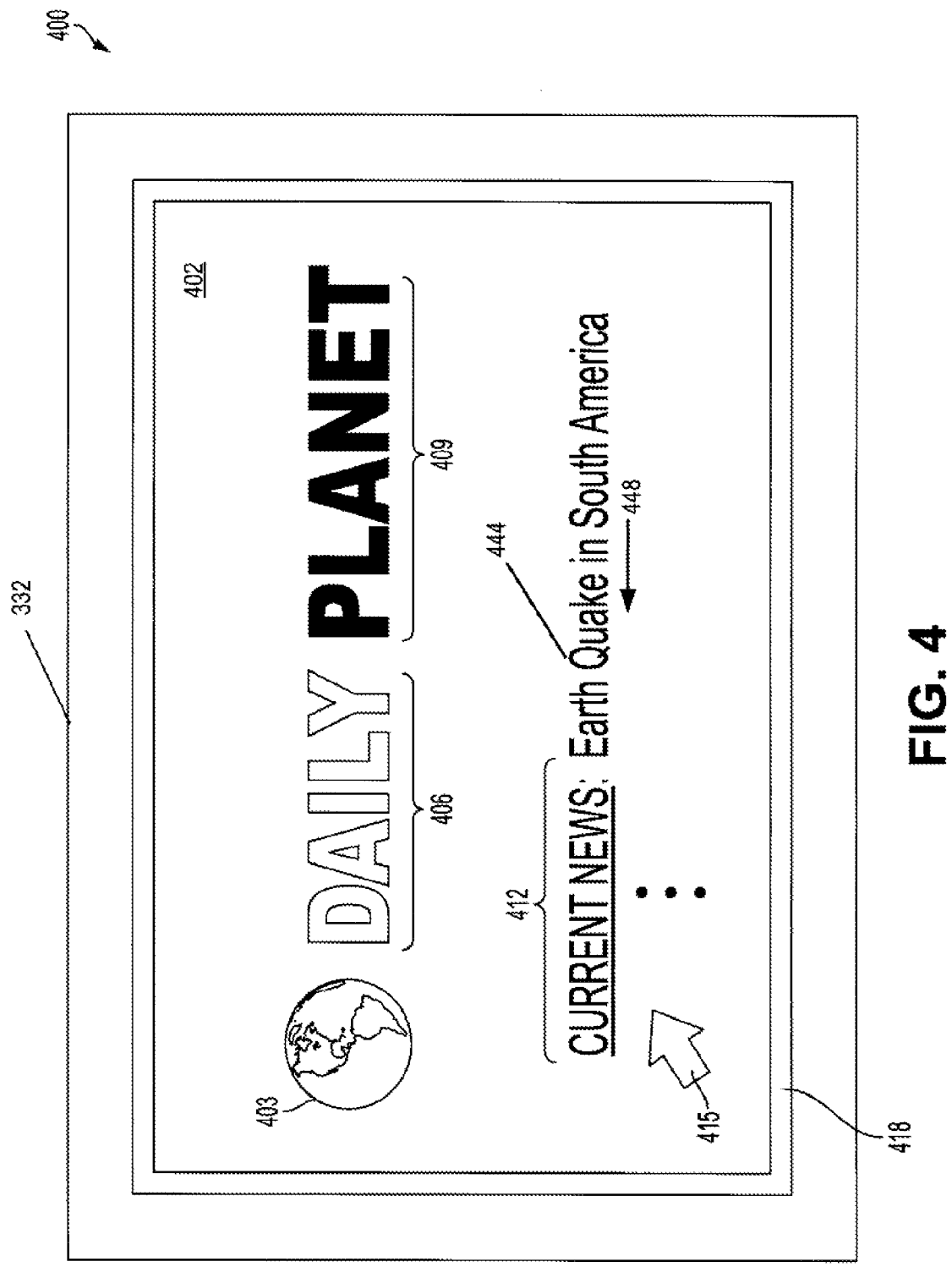
FIG. 4 is a diagram of a screen presenting the content of a webpage downloaded by a wireless handheld computing device.

FIG. 4 is a diagram of a screen 400 presenting the content of a webpage 402 downloaded by a wireless handheld computing device 200. The webpage 42 may comprise a graphical image 403, first text 406, second text 409, third text 412, ticker text 444, and a graphical rectangular border 418. As part of the user interface 106, a screen pointer 415 may be provided. In the exemplary embodiment illustrated, the graphical image 403 includes a globe provided with continents depicted with outlines. The ticker text 444 comprising the phrase, "Earth Quake in South America," may be designed to move across the webpage 402 along the directional arrow 448 like a news ticker, which simulates printed out incoming news stories on paper tape.

The first text 406 may comprise the word, "DAILEY," while the second text 409 may comprise the word, "PLANET." The first text 406 may have a first font and a first color. The exemplary first color illustrated for the first text 406 is white. Similarly, the second text 409 may have a first font and a second color. The second color illustrated for the second text 409 is black. In this figure, the ticker text 444 has scrolled across the page 402 along directional arrow 448 to reveal the text, " . . . South America—Hundreds injured . . . " One of ordinary skill the art appreciates that the invention is not limited to the exemplary text 406, 409, 412, 444, or the exemplary image 403 depicted. Other text and other images are within the scope of the invention.

Figure 5:
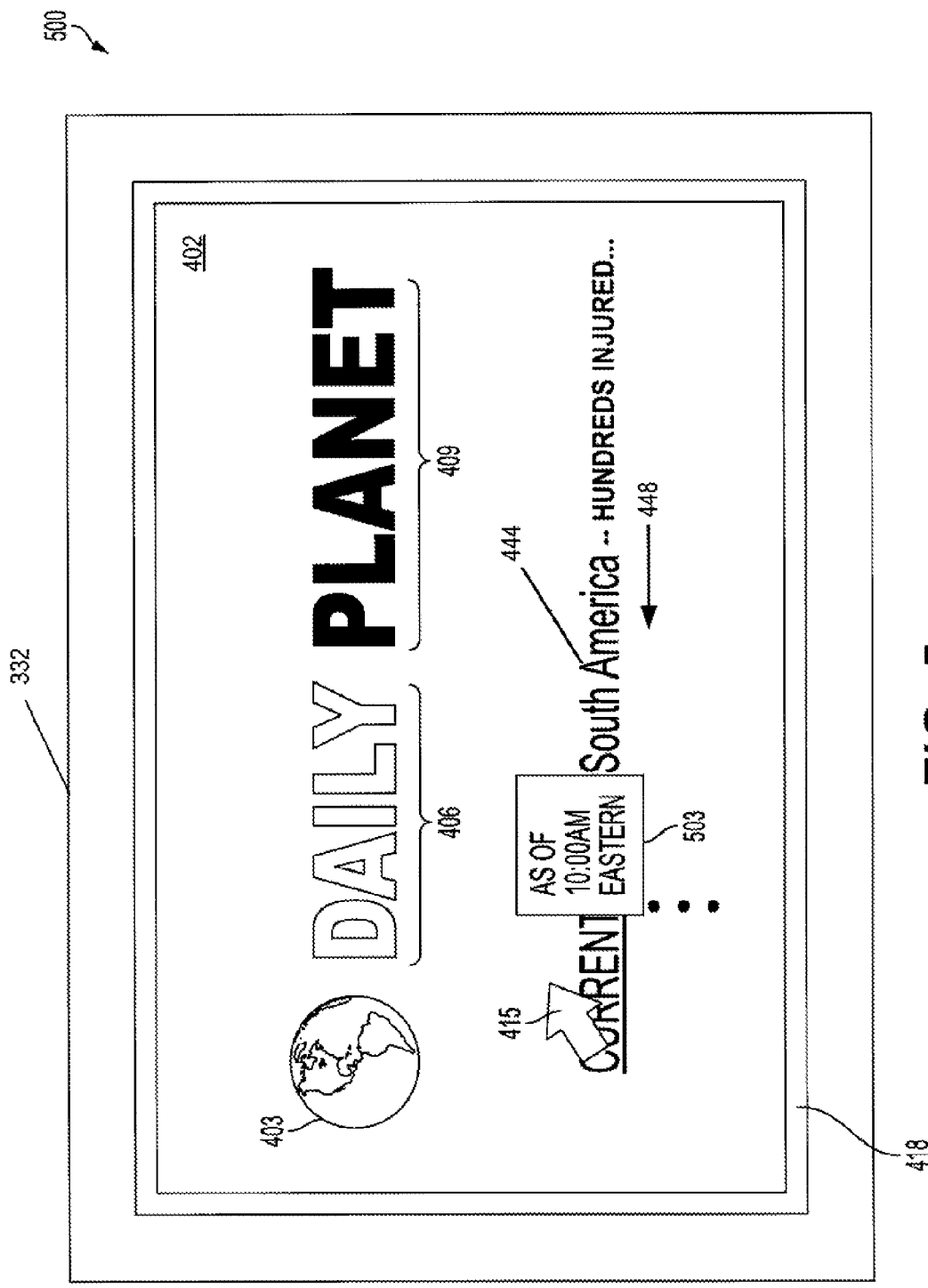
FIG. 5 is a diagram of a screen listing the content of the webpage illustrated in which a mouse-over display is generated on the webpage in response to input from the user interface comprising the screen.

FIG. 5 is a diagram of a screen 500 providing the content of the webpage 402 illustrated in FIG. 4 in which a mouse-over display 503 is generated on the webpage 402 in response to input from the user interface 106 comprising the screen 500. Specifically, in this exemplary embodiment, the screen pointer 415 has been moved over the third text 412. In response to this movement over the third text 412, the user interface 106 generates a mouse-over display 503 that comprises a chronological time listing in which the third text 412 was created according to this exemplary embodiment.

Specifically, the mouse-over display 503 displays the time of when the third text 412 was produced in response to the screen pointer 415 being moved over the third text 412 which comprises the phrase, "Current News," in this exemplary embodiment. This mouse-over display 503 allows the user to comprehend or understand exactly how "current" the information being displayed on the webpage 402 is. One of ordinary skill the art recognizes that this particular mouse-over display 503 is exemplary in nature, and therefore, other mouse-over displays 503 or other types of interactive user interfaces are well within the scope of the invention.

Figure 6:
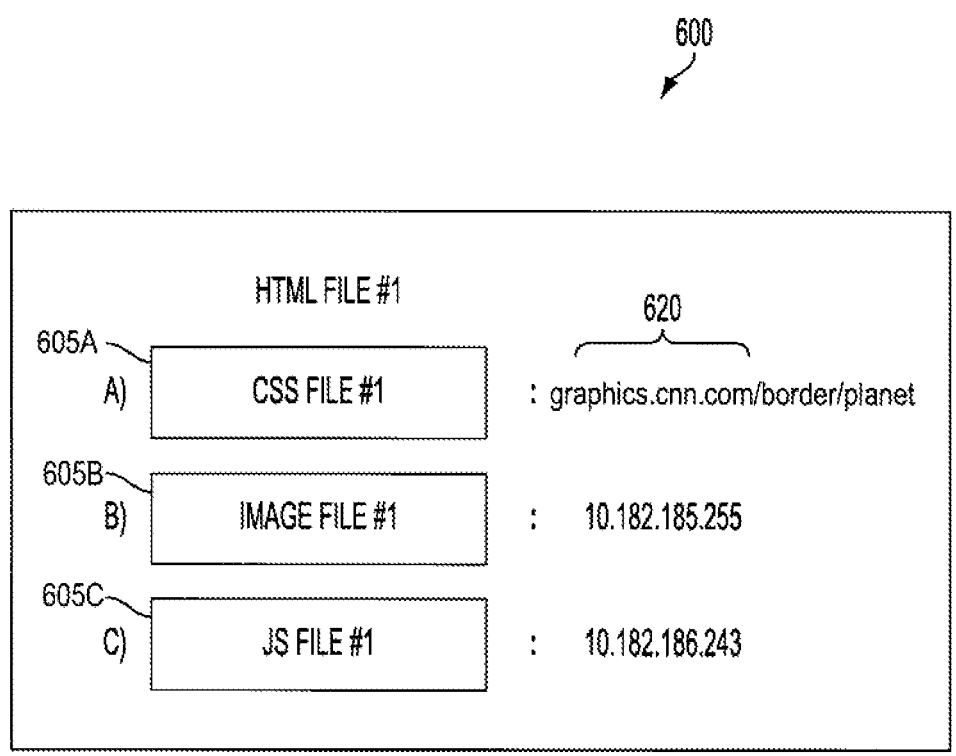
FIG. 6 is a diagram of a data structure for an exemplary hypertext markup language ("HTML") file which may be downloaded by a wireless handheld computing device.

FIG. 6 is a diagram of a data structure for an exemplary hypertext markup language ("HTML") file 600 which may be downloaded by a wireless handheld computing device 200 and which corresponds to the webpage 402 as illustrated in FIG. 5. The HTML file 600 may comprise a name "CSS FILE #1" for a cascading style sheet ("CSS") file 605A, a name "IMAGE FILE #1" for an image file 605B, and a name "JS FILE #1" for a JavaScript ("JS") file 605C. Adjacent to these three file names may be a listing 620 of Internet protocol ("IP") addresses or domain names (or both) as understood by one of ordinary skill in the art.

The browser engine 117 can review and parse the HTML file 600 to uncover the IP addresses in the listing 620 corresponding to the different files 605A, 605B, and 605C also referred to as objects. The browser engine 117 can also determine the type of objects 605 based on the file types listed in the header information as understood to one of ordinary skill in the art.

Figure 7:
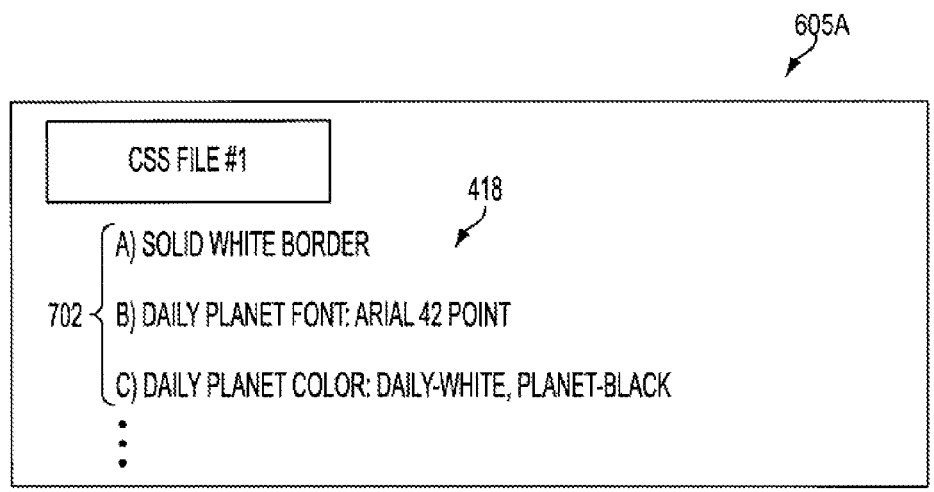
FIG. 7 is a diagram of a data structure for an exemplary cascading style sheet ("CSS") file which may be downloaded by a wireless handheld computing device.

FIG. 7 is a diagram of a data structure for an exemplary cascading style sheet ("CSS") file 605A—"CSS FILE #1" which may be downloaded by a wireless handheld computing device 200. In the exemplary embodiment, the CSS file 605A may have a simple syntax and may use a number of English keywords to specify the names of various style properties. The CSS file 605A may comprise a list of rules. Each rule or rule-set may include of one or more selectors and a declaration block. A declaration-block usually includes a list of declarations in braces.

Each declaration itself may comprise a property, a colon (:), a value, then a semi-colon (;). The CSS file 605A may be used to declare which of the markup elements a style applies to, a kind of match expression. The CSS file 605A may include selectors. Selectors may apply to all elements of a specific type, or only those elements which match a certain attribute; elements may be matched depending on how they are placed relative to each other in the markup code, or on how they are nested within the document object model.

In print, the CSS file 605A may define color, font, text alignment, size, borders, spacing, layout and many other typographic characteristics. It can do so independently for on-screen and printed views. The CSS file 605A may also define non-visual styles such as the speed and emphasis with which text is read out by aural text readers.

In the exemplary embodiment illustrated in FIG. 7, the CSS file 605A comprises data 702 that addresses the white border 418 and the font and color for the first and second text 406 and 409. Specifically, the CSS file 605A describes the color of the border 14 as being white, and the color of the first and second text 406 and 409. The first text 406 has been provided with the color of white while the second text 409 has been provided with the color of black. The font for the first and second text 406, 409 has been set to forty-two point Arial font, as one non-limiting example.

Figure 8:
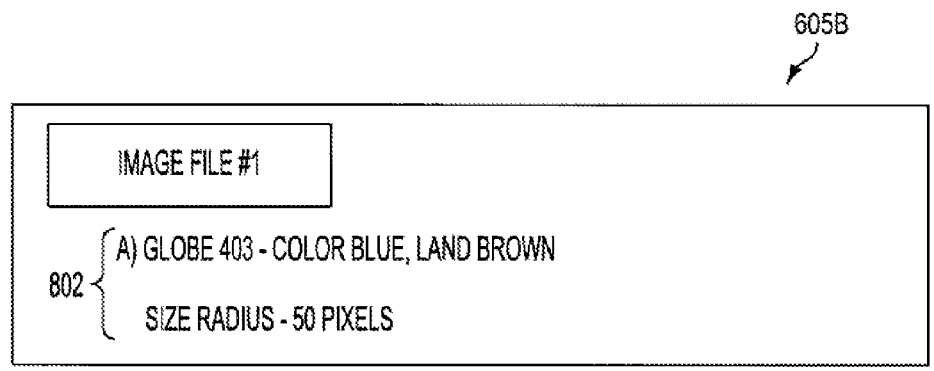
FIG. 8 is a diagram of a data structure for an exemplary image file that may be downloaded by a wireless handheld computing device.

FIG. 8 is a diagram of a data structure for an exemplary image file 605B having the name of "IMAGE FILE #1" that may be downloaded by a wireless handheld computing device 200. The image file 605B may comprise data 802 that provides the physical properties of the image 403 as illustrated in FIGS. 4-5. In the exemplary embodiment illustrated in FIG. 8, the image data 802 provides information relating to the color and size of the globe depicted as the image 403 of FIG. 4.

Figure 9:
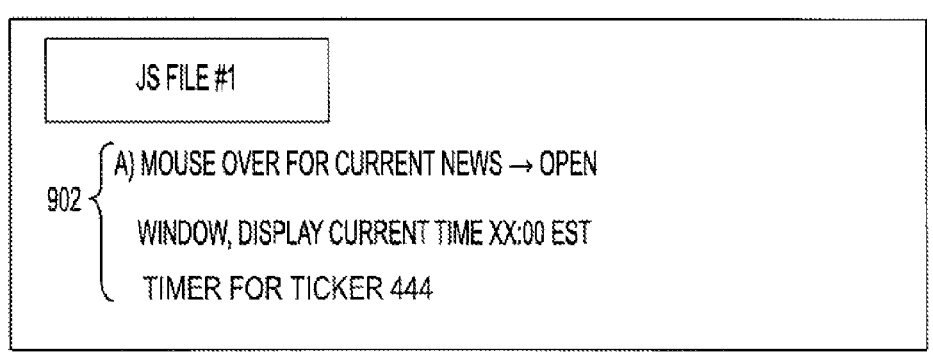
FIG. 9 is a diagram of a data structure for an exemplary JavaScript (JS) file that may be downloaded by a wireless handheld computing device.

FIG. 9 is a diagram of a data structure for an exemplary JavaScript (JS) file 605C that may be downloaded by a wireless handheld computing device 200. The JS file 605C may comprise write functions that are used to embed in or include from HTML pages and interact with a Document Object Model (DOM) of the web page 402. For example, the JS file 605C may be responsible for opening or popping up a new window with programmatic control over the size, position, and attributes of the new window (e.g. whether the menus, toolbars, etc. are visible). See, for example, the mouse-over display 503 of FIG. 5 as well as the ticker text 444 of FIGS. 4 and 5.

The JavaScript code within the JS file 605C may run locally in a user's browser 105. It can respond to user actions quickly, making an application feel more responsive. Furthermore, JavaScript code of the JS file 605C may detect user actions which HTML alone usually cannot, such as individual keystrokes. In the exemplary embodiment of FIG. 9, the data 902 of the JS file 605C may comprise instructions of how the mouse-over display 503 is displayed on the webpage 42 as illustrated in FIG. 5.

Figure 10:
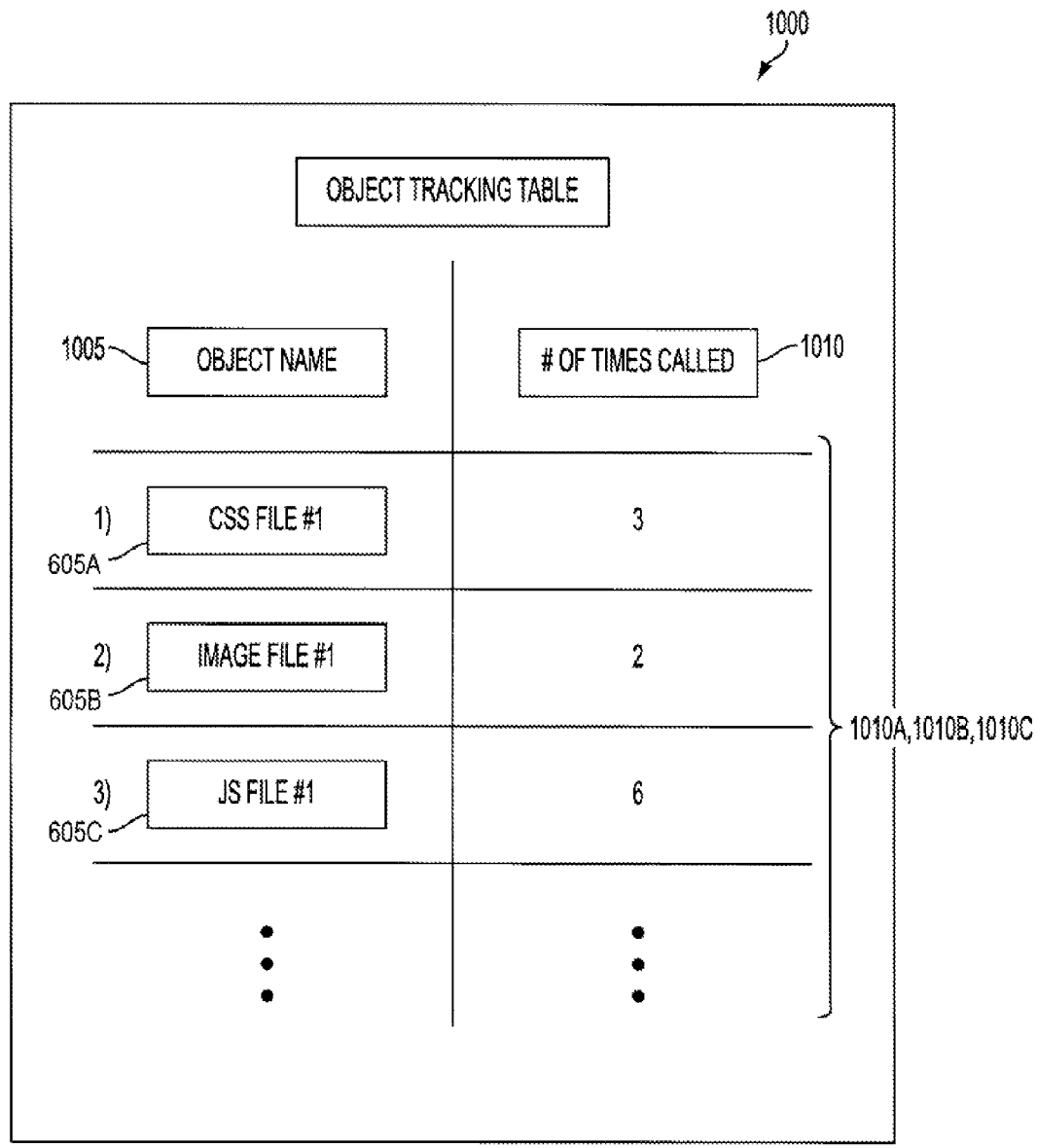
FIG. 10 is a diagram of a data structure for an exemplary object tracking table that may be maintained by a wireless handheld computing device.

FIG. 10 is a diagram of a data structure for an exemplary object tracking table 1000 that may be maintained by a wireless handheld computing device 200, and specifically the DMAS 109A, B of FIG. 1, which may be part of the network stack 107 and/or the HTTP stack 111. The object tracking table 1000 may comprise two columns of data. The first column may comprise object names 1005 while the second column may comprise a number of times that a particular object may have been called 1010.

In the exemplary embodiment illustrated in FIG. 10, the object name column 1005 comprises the CSS File 605A, image file 605B, and JS file 605C. One of ordinary skill the art recognizes that other objects are included within the scope of the invention. The number of times called column 1010 indicates that the CSS file 605A has been called or retrieved by the browsing engine 117 at least three times. Similarly, the number of times called column 1010 indicates that the image file 605B has been retrieved by the browsing engine 117 at least two times. And lastly, the number of times called column 1010 indicates that the JS file 605C has been called or retrieved at least six times by the browsing engine 117.

The DMAS 109 can use the data in the number of times called column 1010 to determine which objects should be retained by memory resources 119 for longer periods of time relative to other objects in order to reduce the retrieval of information from the server 210. In this way, DMAS 109 may reduce the time needed by the wireless handheld computing device 102 to establish a communications link and to exchange data with the server 210. Time may be reduced when the browsing engine 117 pulls objects directly from memory resources 119, that may include the cash, RAM 121, flash memory 123, and as the SD card memory 125.

Figure 11:
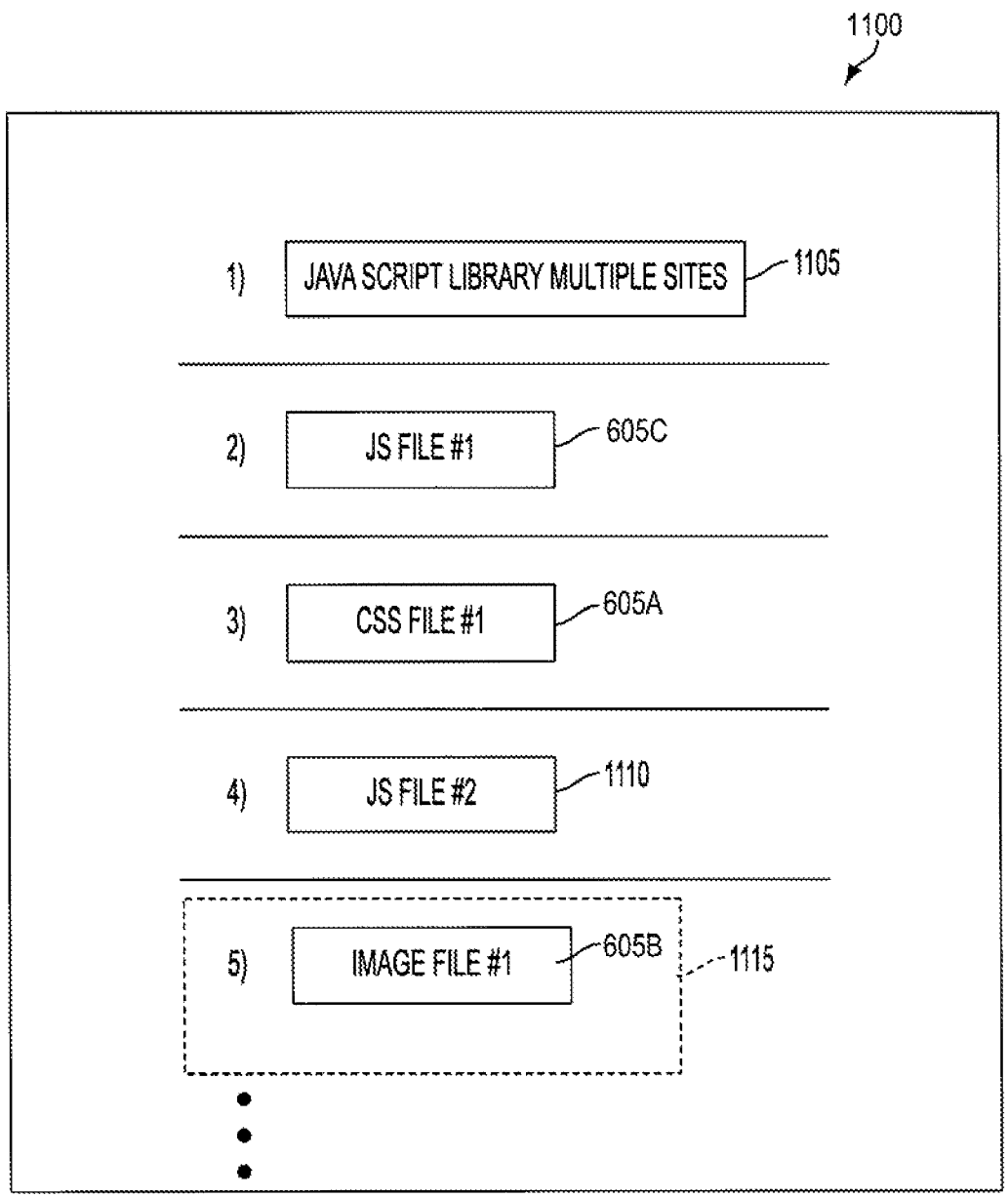
FIG. 11 is a diagram of a data structure for an exemplary priority table that may be maintained by a wireless handheld computing device.

FIG. 11 is a diagram of a data structure for an exemplary priority table 1100 that may be maintained by a wireless handheld computing device 200 in a memory resource 119. Specifically, the priority table 1100 may be created by the DMAS 109 of FIG. 1B and it may be stored within one or more memory resource(s) 119. The priority table 1100 may list the objects stored within the memory resources 119 and in a prioritized fashion in which the lowest number of the priority table 1100 indicates that this particular object will be the last of all of the objects tracked by the priority table 1100 to be removed from the memory resources 119. The higher numbers in the priority table 1100 may indicate those objects with a lesser or reduced priority so that the DMAS 109 can instruct the browsing engine 117 to remove these lower priority objects as needed as conditions dictate as monitored by the network stack 107.

For example, in the exemplary embodiment illustrated in FIG. 11, the JavaScript library accessed by multiple sites 1105 has a higher priority relative to Image File #1 605A. Specifically, the JavaScript library 1105 as a priority value of one while the Image File #1 as a priority value of five. If DMAS 109 of FIG. 1A determines that the one or more memory resources 119 have been filled to capacity or approaching full, capacity, then DMAS 109 can instruct the network stack 107 or the browser engine 117 to discard one or more objects with a lower priority value. Image File #1 605A has been highlighted with a rectangular dashed box 1115 to indicate that this object will be the first object to be discarded if DMAS 109 makes a determination that space within the one or more memory resources 119 is needed.

One of ordinary skill the art recognizes that the priority table 1100 may be organized in an alternate fashion without departing from the scope, of the invention. For example, as an alternate exemplary embodiment the lower numbers of the priority table 1100 may indicate objects with a lower priority while higher numbers may reflect objects having a greater priority over other objects tracked by the priority table 1100.

The DMAS 109 may insert an object in any position within the priority table 1100 based on the priority assigned to an object which may be determined by one or more rules and/or functions. One exemplary rule or function that may be executed and/or tracked by DMAS 109 comprises the object tracking table 1000 as illustrated in FIG. 10 and described above.

Figure 12:
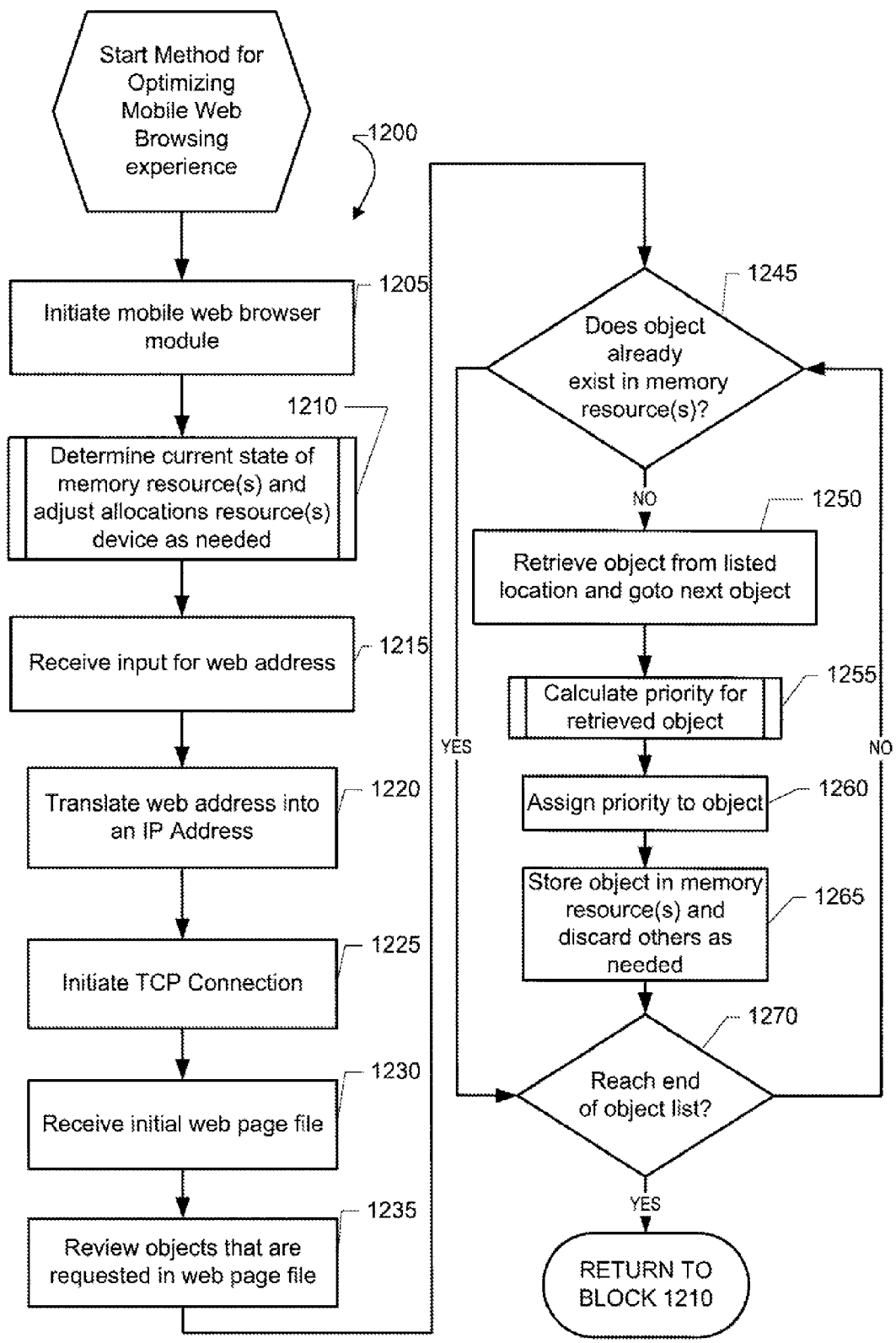
FIG. 12 is a flowchart illustrating a method for managing memory resource(s) of a wireless handheld computing device.

Referring to FIG. 12, this figure is a flowchart illustrating a method 1200 for managing memory resource(s) 1119 of a wireless handheld computing device 200. Block 1205 is the first step in the process 1200 in which a mobile web browser module 105 is initiated in response to a user activating the module 105 through a user interface such as the interface illustrated in FIG. 3. Next, in routine block 1210, the dynamic memory allocation system (DMAS) 109 may determine the current state of memory resources 119 and adjust allocations and/or sizes of those memory resources 119 as needed. Further details of this routine block 1210 will be described below in connection with FIG. 13.

Next, in block 1215, the mobile web browser 105 and particularly the user interface 106 may receive input for a web address for a desired webpage. In block 1220, the network stack 107 receives the web address from the user interface 106 and passes it to the HTTP stack 111 which in turn sends the data to the domain name server module 113. The domain name server module 113 translate the text-based web address into a numeric Internet protocol address as understood to one of ordinary skill in the art.

Next, in block 1225, the HTTP stack 111 issues commands to the TCP connection module 127 to open and initiate a TCP connection using the Internet protocol address determined by the domain name server module 113. Subsequently, in block 1230, the mobile web browser 105, and specifically the browser engine 117, receives the HTML file 600 corresponding to the webpage 402 from the web server 210.

In block 1235, the browser engine module 117 reviews the HTML file 600 to determine the type of objects 605 that are contained within the HTML file 600. The browser engine module 117 also determines the Internet protocol addresses 620 associated with each of the objects 605 contained within the HTML file 600. In the exemplary HTML file 600 illustrated in FIG. 6, there are three object types: a CSS file 605A, an image file 605B, and a JS file 605C. Each of these objects 605 may have different Internet protocol addresses 620 and these addresses 620 may correspond with one or more different servers that store or house the objects 605.

Next, in decision block 1245, the DMAS 109 may instruct the browser engine 117 to determine if an object 605 and its corresponding address currently under review already exists in one or more memory resources 119. In this block 1245, the browser engine 117 may review the object tracking table 1000 and/or the priority table 1100 to determine if a particular object 605 already exists and a memory resource 119. If a particular object 605 already exists in a memory resource 119, then the process proceeds to decision block 1270 in which the browser engine 117 determines if the last of the objects 605 of the HTML file 600 has been reviewed.

In a particular object 605 does not exist in one of the memory resources 119, then the process proceeds to block 1250 in which the browser engine 117 instructs the TCP connection module 127 to initiate a connection based on the Internet protocol address 620 assigned to the object 605 as illustrated in FIG. 6.

Next, in routine block 1255, once the object 605 has been retrieved and sent to the browser engine 117, the DMAS 109 may calculate a priority for the retrieved object 605. Further details of the priority calculation routine block 1255 will be described below in connection with FIG. 14.

After the priority has been calculated by DMAS 109 for the retrieved object 605, the priority may be assigned to the object in block 1260. This priority may be stored in the priority table 1100 of FIG. 11. In step 1265, the object may be stored in memory and other lower priority objects may be discarded as needed. In this step, if DMAS determines that adding the current object will exceed the threshold of memory resources 119, then DMAS 119 can discard objects with lower priority as discussed above in connection with FIG. 11.

Subsequently, in decision block 1270, the browser engine 117 made determine if it has reached the end of its object list for the particular HTML file 600 being reviewed. If the browser engine 117 determines that it has reached the end of its list, then the "YES" branch is followed in the process may return back to routine block 1210.

Figure 13:
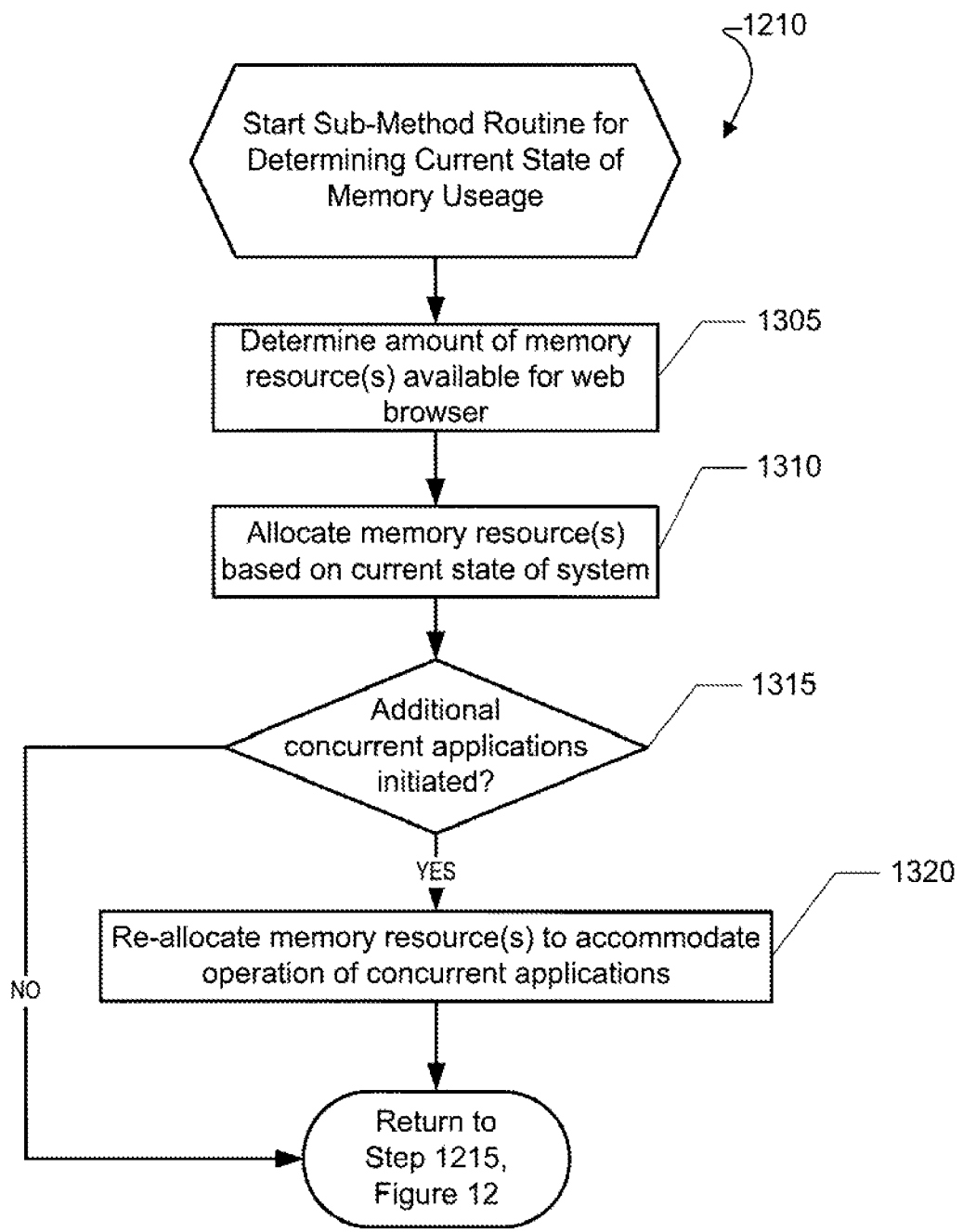
FIG. 13 is a flowchart illustrating a sub-method or a routine of FIG. 12 for determining a current state of memory resources and adjusting memory allocations in a wireless handheld computing device.

FIG. 13 is a flowchart illustrating a sub-method or a routine 1210 of FIG. 12 for determining a current state of one or more memory resources 119 and adjusting allocations of those one or more resources 119 in a wireless handheld computing device 200. Block 1305 is the first step of the sub-method or routine 1210 in which the DMAS 109 may determine the amount of the one or more memory resources 119 available for the web browser 105. In block 1305, DMAS 109 can communicate with the operating system 115 to determine the capacity of the one or more memory resources 119 which may be available for use by the web browser 105.

Next, in block 1310, the DMAS 109 can instruct the network stack 107 or the browser engine 117 to allocate the one or more memory resources 119 based on the current state of the application subsystem 102. In this block 1310, the browser engine 117 can adjust the size or the amount of memory that may be used by the web browser module 105 to store objects 605 in the one or more memory resources 119.

In decision block 1315, DMAS 109 can determine if additional concurrent application modules have been initiated by a user. In this block 1315, DMAS 109 may ping the operating system 115 and/or the operating system 115 may send a message to DMAS 109 when one or more application modules have been initiated by a user. Also, and this decision block 1315, DMAS 109 may also determine the amount or capacity required for each of the application modules that have been initiated in parallel with the mobile web browser 105.

If the DMAS 109 determines that an additional concurrent application module has been initiated, then the "YES" branch may be followed to block 1320 in which the DMAS 109 may instruct the browser engine 117 to re-allocate the one or more memory resources 119 to accommodate the operation of the con current application modules. Generally, this means the DMAS 109 will usually decrease the capacity assigned or allocated for the mobile web browser 105 so that the other concurrent application modules will have sufficient memory resources 119 to operate smoothly. If the DMAS 109 determines that additional concurrent application modules have not been initiated in decision block 1315, then the "NO" branch is followed in which the process returns to block 1215 of FIG. 12.

Figure 14:
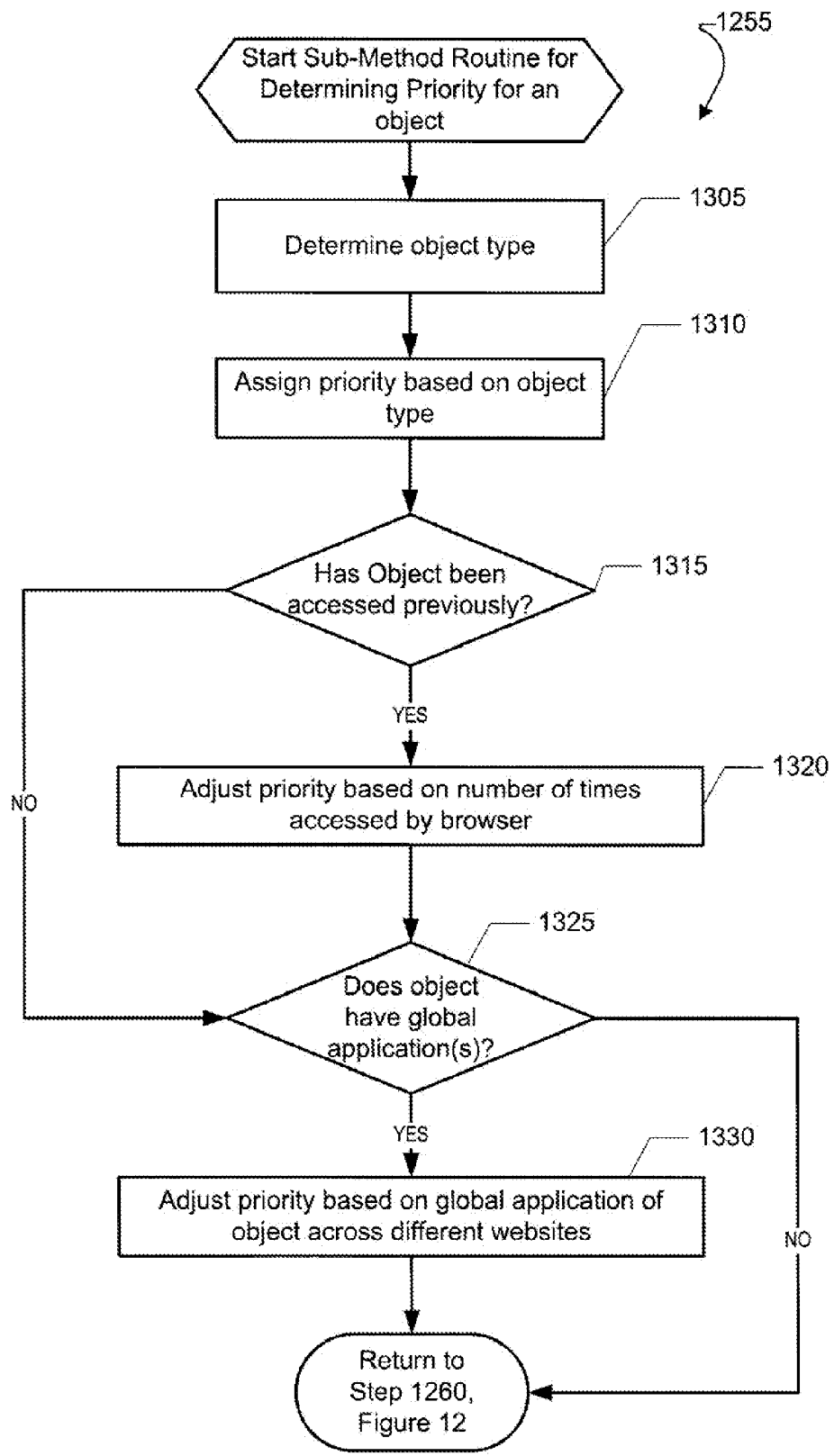
FIG. 14 is a flow chart illustrating a sub-method or a routine of FIG. 12 for determining a priority for an object.

FIG. 14 is a flow chart illustrating a sub-method or a routine 1255 of FIG. 12 for determining a priority of an object 605. Block 1305 is the first step of the sub-method or routine 1255 of FIG. 14. In block 1305, the DMAS 109 may determine the type of object 605 that may be referenced in an HTML file 600. Object types may be provided with a predetermined priority in which more complex objects 605 such as JavaScript files 605C as well as cascade style sheet files 605A are generally assigned a higher priority relative to other objects such as image files 605B. Also, library files such as JavaScript library files 1105 which are retrieved across small to websites may also be weighted and provided with a higher priority relative to all other types of object 605.

In block 1310, the DMAS 109 may assign priority to an object 605 based on the predetermined priority discussed above in connection with block 1305. Next, in decision block 1315, the DMAS 109 may determine if a particular object 605 has been accessed previously by the web browser 105. In this decision block 1315, the DMAS 109 may access the object tracking table 1000 to determine if the particular object 605 has been accessed previously by the web browser 105.

If the DMAS 109 determines that the object has been accessed previously, then the "YES" branch is followed to block 1320 in which the DMAS 109 may adjust the priority of an object 605 based on the number of times the object 605 has been accessed by the browser 105. The DMAS 109 can assign a higher priority to objects 605 which have been accessed more frequently as indicated by the number of times called column 1010 of the object tracking table 1000 of FIG. 10. The DMAS 109 can form a top "ten" list of sites and corresponding objects which are accessed frequently by a user. The invention is not limited to ten sites and could include amounts higher and lower than this amount.

If DMAS 109 determines that an object has not been accessed previously meaning that the object 605 is not present within the object tracking table 1000, then DMAS 109 may make an entry in the object tracking table 1004 that object 605 and then proceed to decision block 1325 in which DMAS 109 can determine if the object 605 may have global applications relative to the web browser 105. In this decision block 1325, the DMAS 109 can determine if the object 605 as global applications based on the object type. As discussed previously, object 605 having global applications may include those like a JavaScript library accessed by multiple sites 1105 as illustrated in FIG. 11. At this stage, if DMAS 109 determines that the object 605 has global applications, then the "YES" branch may be followed to block 1330 in which the DMAS 109 may just be priority of the object 605. In this step, generally the priority of the object 605 is adjusted so that the object 605 has a higher priority because it has been determined that the object 605 may have global applications across different websites. If the inquiry to decision block 1325 is negative meaning that the DMAS 109 has determined that the object 605 does not have any global applications across websites, then the process follows the "NO" branch and the process returns to block 1260 of FIG. 12.

Alternate exemplary embodiments of the invention may use fewer steps for priority routine 1255 of FIG. 14. For example, this means that an alternate exemplary embodiment may only execute block 1310 of assigning priority by type and not execute any other block of priority routine 1255 illustrated in FIG. 14. In further exemplary embodiments, all steps of priority routine 1255 may be performed, however, each step may be provided with a predetermined weighting that is selected by the developer of an application or mobile device 200. For example, block 1310 for object types may be assigned a weighting of 0.9 while block 1320 that adjusts priority by frequency of visits/access may be assigned a weighting of 0.5 which is less than the weighting for block 1310. Other weightings as well as other combinations of what blocks of FIG. 14 are executed are well within the scope of the invention.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for managing one or more memory resources of a wireless handheld computing device, the method comprising:
receiving a request to initiate a web browser module;
receiving an input for a web address;
receiving a file corresponding to the web address;
reviewing one or more addresses within the file, wherein the one or more addresses each point to an object to be accessed by the web browser module;
updating an object tracking table to document an access frequency for each object, wherein the access frequency indicates the number of instances over a given time period that a given object has been accessed by the web browser module;
determining if a first object already exists in the one or more memory resources;
calculating a priority for the first object when the first object does not exist in the one or more memory resources, wherein the priority is based on a type of the first object, an access frequency associated with the first object in the object tracking table, and the first object has global applications relative to operation of the web browser module;
assigning the priority to the first object;
determining if storing the first object in the one or more memory resources will cause a threshold to be exceeded,
discarding from the one or more memory resources one or more other stored objects that are assigned lower priorities in a priority table relative to the priority assigned to the first object when storing the first object in the one or more memory resources will cause said threshold to be exceeded, wherein the first object differs in type from one or more other stored objects; and
storing the first object in the one or more memory sources after any discarding of the one or more other stored objects if the threshold was exceeded.

2. The method of claim 1, further comprising:
determining a current state of the one or more memory resources.

3. The method of claim 2, wherein if a state of the one or more memory resources indicates that an increase in capacity is available for the web browser module, then increasing a capacity available for the web browser module.

4. The method of claim 1, further comprising:
updating the priority table to document that the first object is stored in the one or more memory resources.

5. The method of claim 1, wherein the first object comprises at least one of a cascading style sheet, a java script file, an image file, and a Java script library.

6. The method of claim 1, wherein the wireless handheld computing device comprises at least one of a mobile telephone, a personal digital assistant, a pager, a smartphone, a navigation device, and a hand-held computer with a wireless connection or link.

7. A computer system for managing one or more memory resources of a wireless handheld computing device, the computer system comprising:
a processor configured to:
receive a request to initiate a web browser module;
receive an input for a web address;
receive a file corresponding to the web address;
review one or more addresses within the file, wherein the one or more addresses each point to an object to be accessed by the web browser module;
update an object tracking table to document an access frequency for each object, wherein the access frequency indicates the number of instances over a given time period that a given object has been accessed by the web browser module;
determine if a first object already exists in the one or more memory resources;
calculate a priority for the first object when the first object does not exist in the one or more memory resources, wherein the priority is based on a type of the first object, an access frequency associated with the first object in the object tracking table, and the first object has global applications relative to operation of the web browser module;
assign the priority to the first object;
determine if storing the first object in the one or more memory resources will cause a threshold to be exceeded,
discard from the one or more memory resources one or more other stored objects that are assigned lower priorities in a priority table relative to the priority assigned to the first object when store the first object in the one or more memory resources will cause said threshold to be exceeded, wherein the first object differs in type from one or more other stored objects; and
store the first object in the one or more memory sources after any discarding of the one or more other stored objects if the threshold was exceeded.

8. The computer system of claim 7, wherein the processor is further configured to: determine a current state of the one or more memory resources.

9. The computer system of claim 8, wherein if a state of the one or more memory resources indicates that an increase in capacity is available for the web browser module, then the processor is configured to increase a capacity available for the web browser module.

10. The computer system of claim 7, wherein the processor is further configured to: update the priority table to document that the first object is stored in the one or more memory resources.

11. The computer system of claim 7, wherein the first object comprises at least one of a cascading style sheet, a Java script file, an image file, and a Java script library.

12. The computer system of claim 7, wherein the wireless handheld computing device comprises at least one of a mobile telephone, a personal digital assistant, a pager, a smartphone, a navigation device, and a hand-held computer with a wireless connection or link.

13. A computer system for managing one or more memory resources of a wireless handheld computing device, the computer system comprising:
means for receiving a request to initiate a web browser module;
means for receiving an input for a web address;
means for receiving a file corresponding to the web address;
means for reviewing one or more addresses within the file, wherein the one or more addresses each point to an object to be accessed by the web browser module;
means for updating an object tracking table to document an access frequency for each object, wherein the access frequency indicates the number of instances over a given time period that a given object has been accessed by the web browser module;
means for determining if a first object already exists in the one or more memory resources;
means for calculating a priority for the first object when the first object does not exist in the one or more memory resources, wherein the priority is based on a type of the first object, an access frequency associated with the first object in the object tracking table, and the first object has global applications relative to operation of the web browser module;
means for assigning the priority to the first object;
means for determining if storing the first object in the one or more memory resources will cause a threshold to be exceeded,
means for discarding from the one or more memory resources one or more other stored objects that are assigned lower priorities in a priority table relative to the priority assigned to the first object when storing the first object in the one or more memory resources will cause said threshold to be exceeded, wherein the first object differs in type from one or more other stored objects; and
means for storing the first object in the one or more memory sources after any discarding of the one or more other stored objects if the threshold was exceeded.

14. The computer system of claim 13, further comprising:
means for determining a current state of the one or more memory resources.

15. The computer system of claim 14, wherein if a state of the one or more memory resources indicates that an increase in capacity is available for the web browser module, then increasing a capacity available for the web browser module.

16. The computer system of claim 13, further comprising:
means for updating the priority table to document that the first object is stored in the one or more memory resources.

17. The computer system of claim 13, wherein the first object comprises at least one of a cascading style sheet, a Java script file, an image file, and a java script library.

18. The computer system of claim 13, wherein the wireless handheld computing device comprises at least one of a mobile telephone, a personal digital assistant, a pager, a smartphone, a navigation device, and a hand-held computer with a wireless connection or link.

19. A computer program product comprising a non-transitory computer usable medium having a computer readable program code embodied therein, said computer readable program code adapted to be executed to implement a method for managing one or more memory resources of a wireless handheld computing device, said method comprising:

receiving a request to initiate a web browser module;
  receiving an input for a web address;
  receiving a file corresponding to the web address;
  reviewing one or more addresses within the file, wherein the one or more addresses each point to an object to be accessed by the web browser module;
  updating an object tracking table to document an access frequency for each object, wherein the access frequency indicates the number of instances over a given time period that a given object has been accessed by the web browser module;
  determining if a first object already exists in the one or more memory resources;
  calculating a priority for the first object when the first object does not exist in the one or more memory resources, wherein the priority is based on a type of the first object, an access frequency associated with the first object in the object tracking table, and the first object has global applications relative to operation of the web browser module;
  assigning the priority to the first object;
  determining if storing the first object in the one or more memory resources will cause a threshold to be exceeded, discarding from the one or more memory resources one or more other stored objects that are assigned lower priorities in a priority table relative to the priority assigned to the first object when storing the first object in the one or more memory resources will cause said threshold to be exceeded, wherein the first object differs in type from one or more other stored objects; and
  storing the first object in the one or more memory sources after any discarding of the one or more other stored objects if the threshold was exceeded.

20. The computer program product of claim 19, wherein the program code implementing the method further comprises: determining a current state of the one or more memory resources.

21. The computer program product of claim 19, wherein the program code implementing the method further comprises: determining if a state of the one or more memory resources indicates that an increase in capacity is available for the web browser module, then increasing a capacity available for the web browser module.

22. The computer program product of claim 19, wherein the program code implementing the method further comprises: updating the priority table to document that the first object is stored in the one or more memory resources.

23. The computer program product of claim 19, wherein the first object comprises at least one of a cascading style sheet, a java script file, an image file, and a java script library.

24. The computer program product of claim 19, wherein the wireless handheld computing device comprises at least one of a mobile telephone, a personal digital assistant, a pager, a smartphone, a navigation device, and a hand-held computer with a wireless connection or link.

\* \* \* \* \*